March 9, 1948.  C. C. S. LE CLAIR  2,437,543
PIPE JOINTS
Filed Feb. 23, 1945
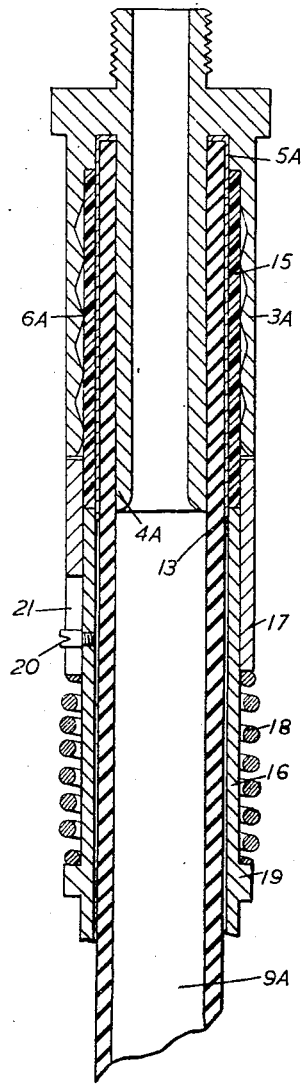
Camille Clare
Sprankling Le Clair.
Inventor
By McCaleb, Wendt
& Dickinson
Attorney Patented Mar. 9, 1948

2,437,543

UNITED STATES PATENT OFFICE 2,437,543

PIPE JOINT

Camille Clare Sprankling Le Clair,
Acton, London, England

Application February 23, 1945, Serial No. 579,326
In Great Britain February 22, 1944

Section 1, Public Law 690, August 8, 1946
Patent expires February 22, 1964

4 Claims. (Cl. 285—84)

(Granted under the provisions of sec. 14, act of
March 2, 1927; 357 O. G. 5)

This invention relates to couplings, adapters or other devices, which comprise a ferrule at one end adapted to be attached to a hose of rubber, fabric or other flexible material and means, such as a screwed shank, whereby the coupling, adapter or other device may be attached to another coupling, adapter or other device or apparatus, hereinafter, for simplicity of description, such couplings, adapters, or other devices, will be referred to as "couplings."

Many methods of attaching rubber, fabric or other flexible hoses to couplings are known, such, for example, as that wherein the hose is first passed as a fairly tight sliding fit over a tubular ferrule and is then clipped thereto by one or more circumferential clips tightened by tangent screws. Such means, however, are objectionable in that the tightening screws are clumsy and essentially asymmetrical, while they constitute projections from the circular form of the coupling which may be a danger to the user's hands. Further, the clips themselves are liable to break and to get lost.

The object of the present invention, therefore, is to provide improved hose couplings and improved methods for attaching couplings to hoses.

According to the present invention, a hose coupling is characterised by the feature that it comprises an outer ferrule part and a hollow inner ferrule part which are separated by an annular recess in which the end of the hose is fitted, the outer ferrule part being formed internally with a number of recesses or indentations into which crushable material, arranged in the said recess around the hose, can be forced in order that the hose shall be gripped firmly in the coupling.

A liner of crushable or plastic material, such as lead, may be arranged around the hose in the said recess between the outer and inner ferrules, the arrangement being such that when the liner is crushed by endwise pressure, it flows into the said recesses or indentations in the outer ferrule part. This construction can also be modified by fitting a thin metallic sleeve inside the said liner around the end of the hose to be gripped, in which case endwise pressure applied to the liner will also result in the sleeve being pressed into the hose. The sleeve provides a sliding surface whereby the liner of crushable or plastic material can be more easily crushed, without tearing the surface of the hose as might happen if the liner was in direct contact with the hose.

In the disclosure of my invention which is shown by way of example in the accompanying drawing:

The figure is a sectional view of a construction of hose coupling which shows a method of expanding the liner of crushable material which is included in this construction.

In the simple constructional form of the invention shown in the figure, the body of the coupling is formed with an outer and an inner ferrule part 3A and 4A separated by a longitudinal recess 5A. The outer ferrule part is also formed internally with circular or spiral flutings 6A but the inner ferrule part is not formed with an internal protuberance as in the case of the construction described above. Further, for a purpose to be described hereinafter, the recess 5A is enlarged over a portion of its length.

A thin brass sleeve or skid 13, having an apertured flange 14 at one end, is fitted over the end of the hose 9A which is to be engaged between the inner and outer ferrule parts. The hose is a tight sliding fit over the inner ferrule part and the end of the hose and brass sleeve 13 thereon are forced on to the inner ferrule part until the apertured flange on the sleeve fits against the inner end of the recess between the ferrule parts. Thereafter, a liner 15 of plastic material, such as lead, or mouldable material such as a mouldable resin, previously arranged over the end of the hose 9A, is inserted in the said enlarged part of the recess 5A in the coupling between the brass sleeve 13 and the flutings 6A, the inner end of the liner fitting against a shoulder in the outer ferrule part. The liner 15 is of such a length that it projects beyond the end of the outer ferrule part 3A. The thin brass sleeve acts to permit the lead to slide endwise which it would not do against the bare rubber of the hose.

The end of the hose is fixed in position in the coupling by means of a tubular mandrel 16, which is fitted over the hose and the protruding end of the thin brass sleeve 13 and is thrust against the protruding end of the liner 15 with sufficient force to compel the latter to flow hydraulically. Thus, the material of the liner 16 fills the flutings 6A and also crushes the thin brass sleeve 13 into the hose. When this operation is completed, the outer end of the liner 15 should be substantially flush with the end of the outer ferrule part. In order to support the exposed part of the liner 15 and to prevent it buckling during the crushing of the liner, a sleeve 17 is slidably arranged on the tubular mandrel 16 and is held in position against the end of the outer ferrule part by means of a coil spring 18 which is arranged around the mandrel and which reacts between a shoulder 19 on the mandrel and the outer end of the slidable sleeve 17. The movement of the slidable sleeve is limited by a pin 20 which is screwed into the mandrel and engages in a slot 21 formed in the slidable sleeve.

When the mandrel is forced forwards to compress the liner 15, the stop pin 20 slides forwards in the slot 21, the coil spring 18 is compressed and acts to hold the slidable sleeve 17 constantly against the end of the outer ferrule part 3A. After the operation has been completed and the mandrel has been withdrawn, the slidable sleeve 17 returns automatically to its original position.

In a modification, the outer surface of the inner ferrule may also be formed with a series of circular or helical flutings.

I claim:

1. A hose coupling comprising, in combination, an outer ferrule part having internal indentations, an inner ferrule part, said ferrule parts being joined at one end and being separated by an annular recess, said ferrules and recess being of sizes to fit onto the end of a hose with the hose disposed in the recess, a liner of plastic material within the recess and interposed between the hose and the outer ferrule part, and means for expanding said liner of plastic material laterally of the recess by the application of force thereto in a direction endwise of the ferrules.

2. A hose coupling comprising, in combination, an outer ferrule part having internal indentations, an inner ferrule part, said ferrule parts being joined at one end and being separated by an annular recess, said ferrules and recess being of sizes to fit onto the end of a hose with the hose disposed in the recess, a metal sleeve encircling said hose within the recess, a liner of plastic material within the recess and interposed between the sleeve and the outer ferrule part, and means for expanding said liner of plastic material laterally of the recess by the application of force thereto in a direction endwise of the ferrules to force the plastic material into said indentations and to press said sleeve into the hose.

3. The method of fixing a hose in a hose coupling which has an outer ferrule part provided with internal indentations, an inner ferrule part separated from the outer ferrule part by an annular recess, and a liner of plastic material adapted to fit within said recess adjacent the outer ferrule and in spaced relationship to the inner ferrule comprising the steps of fitting the liner over the end of the hose, inserting the hose and liner into the annular recess, and applying endwise pressure to said liner to effect flow of the liner into the indentations and apply pressure against the hose.

4. The method of fixing a hose in a hose coupling which has an outer ferrule part provided with internal indentations, an inner ferrule part separated from the outer ferrule part by an annular recess, and a liner of plastic material adapted to fit within said recess adjacent the outer ferrule and in spaced relationship to the inner ferrule comprising the steps of placing a thin metal sleeve on the end of the hose, fitting the liner over the end of the hose and sleeve, inserting the hose, sleeve and liner into the annular recess, and applying endwise pressure to said liner to effect flow of the liner into the indentations and applying pressure against the sleeve and hose.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 199,349 | Caswell | Jan. 22, 1878 |
| 2,146,756 | Miller | Feb. 14, 1939 |
| 2,176,756 | Miller | Feb. 14, 1939 |
| 2,268,088 | Scholtes | Dec. 30, 1941 |
| 2,298,379 | Hoffman | Oct. 13, 1942 |
| 2,311,662 | Hunziker | Feb. 23, 1943 |

FOREIGN PATENTS

| Number | Country | Date |
| --- | --- | --- |
| 50,970 | Germany | Mar. 1, 1890 |